US010681630B2

(12) United States Patent
McKibben et al.

(10) Patent No.: US 10,681,630 B2
(45) Date of Patent: *Jun. 9, 2020

(54) VIRTUAL CELLS FOR RADIO ACCESS NETWORK (RAN) SHARING

(71) Applicant: CABLE TELEVISION LABORATORIES, INC., Louisville, CO (US)

(72) Inventors: Bernard McKibben, Golden, CO (US); Mark J. Poletti, Louisville, CO (US); Kyung Mun, Superior, CO (US); Daniel Rice, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,461

(22) Filed: Oct. 3, 2018

(65) Prior Publication Data
US 2019/0037494 A1 Jan. 31, 2019

Related U.S. Application Data

(63) Continuation of application No. 15/162,218, filed on May 23, 2016, now Pat. No. 10,098,064.
(Continued)

(51) Int. Cl.
H04W 36/00 (2009.01)
H04W 52/02 (2009.01)
(Continued)

(52) U.S. Cl.
CPC ....... H04W 52/0209 (2013.01); H04W 24/02 (2013.01); H04W 16/32 (2013.01);
(Continued)

(58) Field of Classification Search
USPC ............ 455/410, 414.3, 453, 436, 445, 406; 370/338, 335
See application file for complete search history.

(56) References Cited

U.S. PATENT DOCUMENTS 8,483,726 B1 * 7/2013 Khanka ................. H04W 68/02
455/453
2005/0185623 A1 * 8/2005 Ray ....................... H04W 12/06
370/338
(Continued)

Primary Examiner — David Q Nguyen
(74) Attorney, Agent, or Firm — David Smith; Cable Television Laboratories, Inc.

(57) ABSTRACT

Systems and methods herein provide for the aggregation of a plurality of wireless base stations for access by a Mobile Central Office (MCO) communicating with user equipment (UEs) through a network. In one embodiment, a communication system includes a first plurality of wireless base stations, each being operable to communicate with UEs. The system also includes a base station aggregator operable to aggregate the wireless base stations into a virtual base station, and to interface with the MCO. The base station aggregator is further operable to process a request from the MCO for access to communications provided by the virtual base station, to grant the request, to intermediate on behalf of the MCO, and to exchange communications between the MCO and a UE subscribing to the MCO and operating within the coverage of the virtual base station.

27 Claims, 6 Drawing Sheets

Related U.S. Application Data

(60) Provisional application No. 62/165,549, filed on May 22, 2015.

(51) Int. Cl.
*H04W 24/02* (2009.01)
*H04W 16/32* (2009.01)
*H04W 88/12* (2009.01)

(52) U.S. Cl.
CPC ............ *H04W 88/12* (2013.01); *Y02D 70/00* (2018.01); *Y02D 70/122* (2018.01); *Y02D 70/124* (2018.01); *Y02D 70/1262* (2018.01); *Y02D 70/142* (2018.01)

(56) References Cited

U.S. PATENT DOCUMENTS

| | | | |
|---|---|---|---|
| 2006/0291455 A1* | 12/2006 | Katz | H04L 29/06 370/355 |
| 2007/0224990 A1* | 9/2007 | Edge | H04W 8/24 455/436 |
| 2009/0170472 A1* | 7/2009 | Chapin | H04W 28/18 455/410 |
| 2010/0261478 A1* | 10/2010 | Schmidt | H04W 40/20 455/445 |
| 2010/0330955 A1* | 12/2010 | Chan | H04W 8/265 455/406 |
| 2011/0117897 A1* | 5/2011 | Lee | H04M 1/575 455/414.3 |

* cited by examiner

VIRTUAL CELLS FOR RADIO ACCESS NETWORK (RAN) SHARING

CROSS REFERENCE TO RELATED APPLICATIONS

This patent application is a continuation of U.S. patent application Ser. No. 15/162,218, filed May 23, 2016, which application claims priority to, and thus the benefit of an earlier filing date from, U.S. Provisional Patent Application No. 62/165,549 (filed May 22, 2015), the entire contents of which are hereby incorporated by reference.

BACKGROUND

Cellular telephony continues to evolve at a rapid pace. Cellular telephone networks currently exist in a variety of forms and operate using a variety of modulations, signaling techniques, and protocols, such as those found in 3G and LTE networks (3rd Generation of mobile telecommunications technology and Long Term Evolution, respectively). As consumers require more capacity, the networks usually evolve. For example, some carriers, or Mobile Network Operators (MNOs), employ the faster LTE because, as demand for data and voice increased, the MNOs needed faster networks.

And, the very different ways in which the networks operate further complicate network changes. For example, 3G networks would handle wireless communications through a base station by connecting the communications to a Public Switching Telephone Network (PSTN) through a Mobile Telephone Switching Office (MTSO) of the MNO. In LTE, however, wireless communications through base stations are typically handled through packet switching networks so a connection to the PSTN is not necessary in many cases. In either case, each network of a MNO includes some sort of Mobile Central Office that is operable to handle the communications between wireless devices (also known as user equipment) and base stations.

Still, even with these faster networks, the demand for more data appears to outpace MNO capabilities. And, the demand can change from day to day or even hour to hour. For example, when a location experiences a rapid increase in population, such as what occurs during sporting events, the MNOs capacity can be overwhelmed. And, when an MNO's capacity is overwhelmed, communications between user equipment and base stations get dropped.

Shared base station deployments exist but they are typically isolated and relatively small. And, several challenges have prevented their adoption due to needed size to accommodate many users. For example, neighbor cell provisioning across networks with large quantities of cells is difficult. And, the integration of network to network interfaces between small cells and larger "macro" network cells is even more difficult. Moreover, when user equipment (UEs) traverses from cell to cell, the constant change in signaling significantly taxes and drains the batteries of the UEs. That is, a larger macro cell saves UE battery life because it provides more coverage control of its base stations such that the UE does not need to constantly register with as many base stations.

SUMMARY

Systems and methods herein provide for the aggregation of a plurality of wireless base stations for access by a Mobile Central Office (MCO) of an MNO communicating with user equipment (UEs, such as wireless devices) through a network. In one embodiment, a communication system includes a first plurality of wireless base stations, each being operable to communicate with UEs. For example, each wireless base station is generally operable to handle a session (i.e., a voice call, a data connection, etc.) from a UE and to handoff the session to another of the wireless base stations when the wireless device moves into a range of the other wireless base station. The system also includes a base station aggregator operable to aggregate the wireless base stations into a virtual base station, and to interface with the MCO. The base station aggregator may be further operable to process a request from the MCO for access to communications provided by the virtual base station, to grant the request, to intermediate on behalf of the MCO, and to exchange communications between the MCO and a UE subscribing to the MCO and operating within the virtual base station.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1A:
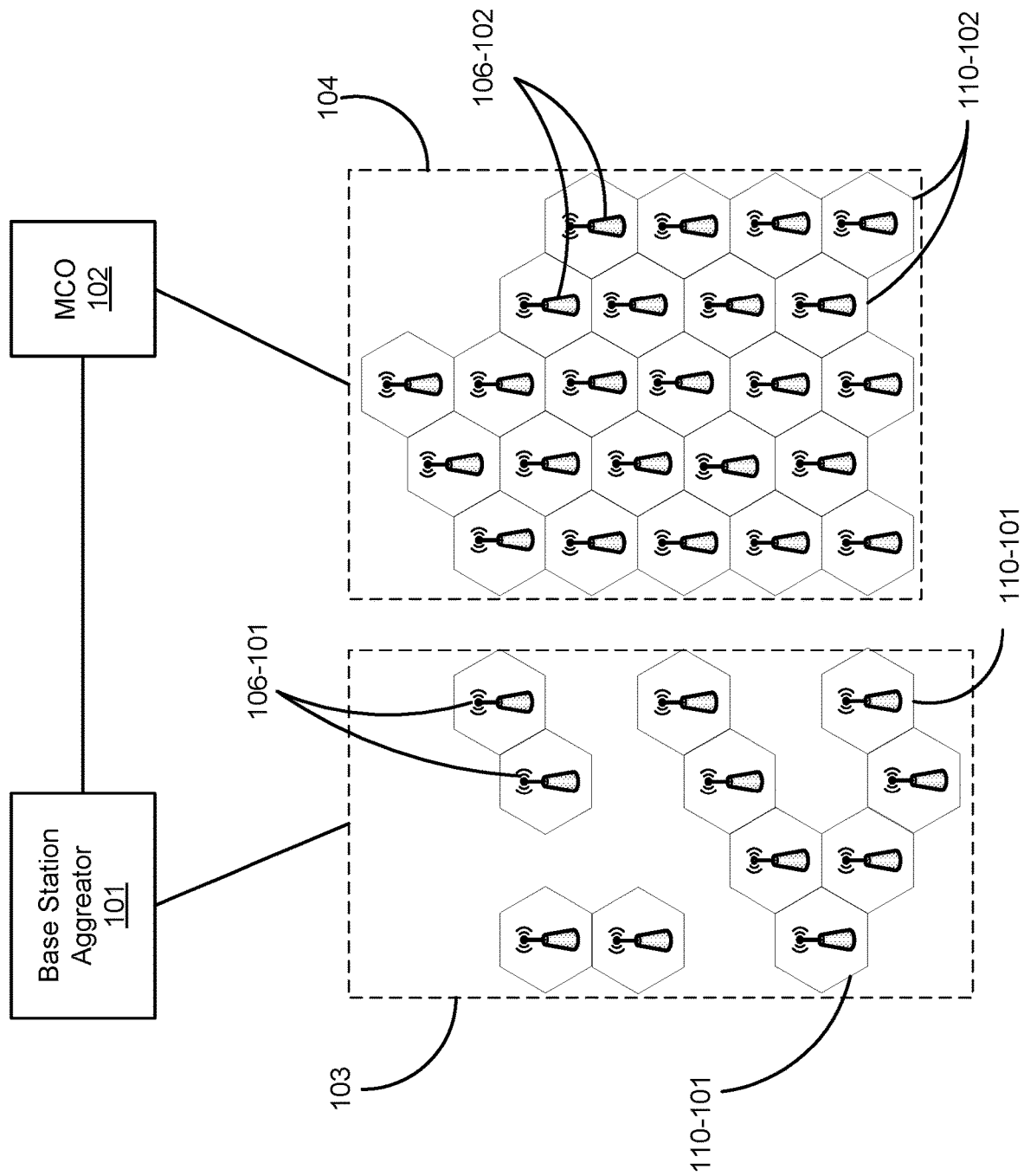
FIGS. 1A and 1B are block diagrams of an exemplary wireless communication system.
Figure 1B:
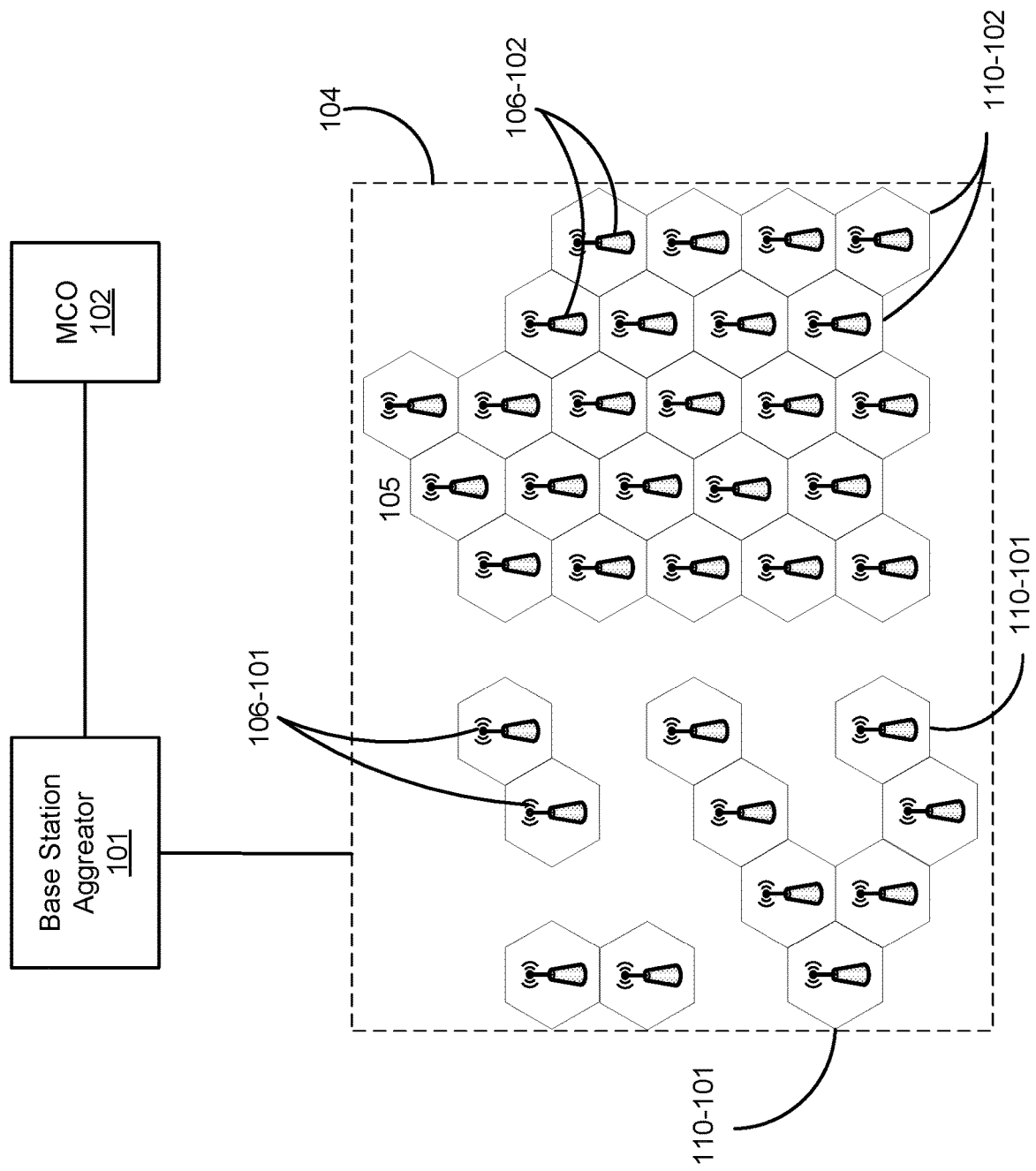

FIGS. 1A and 1B are block diagrams of an exemplary wireless communication system. The wireless communication system includes a base station aggregator 101 and a plurality of wireless base stations 106-101. The base station aggregator 101 is operable to interface with an MCO 102 to aggregate the base stations 106-101 into a virtual base station 103 that provides additional capacity to the MCO 102.

To illustrate, in FIG. 1A, the MCO 102 is communicatively coupled to a plurality of wireless base stations 106-102 to provide communications to UEs operating within cell coverages 110-102 of the wireless base stations 106-102. The MCO 102 operates and manages each of the base stations 106-102 so as to provide a network coverage area 104 for each of its subscribing UEs. Occasionally, however, the MCO 102 needs additional capacity for its subscribing UEs. This may be due to UEs moving out of the network coverage area 104 of the MCO 102, increased capacity requirement due to UEs overloading a particular base station 106-102, or the like. The MCO 102, in this regard, communicates with the base station aggregator 101 to acquire additional capacity from the virtual base station 103.

The base station aggregator 101 can provide the additional capacity of the virtual base station to the MCO 102 for its subscribing UEs, as well as any other UEs "roaming" into the network coverage area 104. Generally, though, the base stations 106-101 are comprised of a plurality of independent operators and/or quickly deployable "hotspots" with each covering a limited coverage area 110-101 (e.g., a cell). For example, indoor conventions hosting a relatively large number of people may need wireless telephony for those people. Oftentimes, the buildings of these indoor conventions shield communications of the larger MCO network. Accordingly, one or more hotspot base stations 106-101 may be deployed within the building so that the people attending the convention can receive wireless telephony services. And, while the base station aggregator 101 operates and maintains the hotspot base station(s) 106-101 as a virtual base station 103, the MCO 102 may control the virtual base station 103 and the UEs in a manner that is transparent to the UEs.

Each of these base stations 106-101 may employ communication protocols (e.g., Edge network, 2G, 3G, etc.) that differ from that of the MCO 102 (e.g., LTE) and its base stations 106-102. The base station aggregator 101 is operable to independently communicate with each of the base stations 106-101 and provide a translation which allows the base station aggregator 101 to aggregate the base stations 106-101 into a virtual base station 103, as illustrated in FIG. 1B.

Thus, as illustrated in FIG. 1B, when the base station aggregator 101 grants access to the virtual base station 103, the virtual base station 103 and its associated base stations 106-101, come under control of the MCO 102 and are considered part of the network coverage area 104 of the MCO 102. The base station aggregator 101 then translates communications between the MCO 102 and the base stations 106-101 until the additional capacity is no longer required by the MCO 102.

Based on the forgoing, an MCO is any system, apparatus, software, or combination thereof operable to maintain or otherwise support wireless communications, including data and voice, with subscribers via UEs (e.g., mobile handsets and other wireless devices). Accordingly, the MCO may be a wireless communications carrier or network (e.g., carbon MNO) employing, for example, 2G, 3G, LTE, WiFi, or any combination thereof. And, a base station 106 is any device or system operable to communicate with UEs via Radio Frequency (RF).

Generally, when MCOs are owned, managed, or otherwise controlled by separate entities, the competitive nature of the environment prevents cooperation among of MCOs, such as MCO 101. However, the ability to share capacity with MCOs can be quite beneficial. For example, in emergency situations where the MCO happens to be over capacity with its subscribers and a base station 106-101 operating in the same area is not, moving capacity from the base station aggregator 101 would advantageously allow the over capacity MCO to establish communications for more of its subscribers and ensure that calls go through.

As used herein, capacity may include Radio Frequency (RF) spectrum, data throughput, backhaul capacity, network processing (e.g., virtualized RANs), channels in a Time Division Multiple Access (TDMA) signal, Code Division Multiple Access (CDMA) channels, channels in a Frequency Division Multiple Access (FDMA) signal, channels in the Orthogonal Frequency Division Multiplexing (OFMD), Carrier Sense Multiple Access (CSMA), and the like. Backhaul capacity may include, among other things, a backhaul portion of a network including intermediate links between a core network (or a backbone network) and smaller subnetworks at an edge of a hierarchical network. Backhaul capacity can also include an obligation to carry data packets to and from a global network, and the like.

In some embodiments, the base station aggregator 101 is operable to do much of the processing of the UE communications as a Virtualized Radio Access Network (VRAN, a.k.a. a "cloud RAN") with each base station 106-101 providing a digitized sample of the entire RF spectrum of interest that may be transmitted from the base station interface. In such an embodiment, the wireless base stations 106-101 may be configured with antennas, transceivers, and digitizers that digitize the radio communications of the RF spectrum in which the UEs operate. A digitized representation of the RF spectrum may thus be transmitted to a remote "cloud" of base station processing. For example, the base station aggregator 101 may allocate a particular frequency band of the radio frequency (RF) spectrum in which its subscriber UEs can operate. And, each base station 106-101 of the base station aggregator 101 may be configured to digitize that portion of the radio frequency (RF) spectrum. Then, each base station conveys the digitized spectrum to the base station aggregator 101 such that the communications of the UEs can be extracted and processed.

In some instances, the base station aggregator 101 is operable to receive digitized spectrums from the base stations 106-101 to constructively re-create the RF communications of a single UE. For example, a UE's signal may be detected/received by multiple base stations 106-101 of the virtual base station 103. Some base stations 106-101 may have stronger detections of the UE whereas other base stations 106-101 may receive "multipath" aspects of the UE's signal. The virtual RAN processes the digitized spectrums of each of the base stations 106-101 and reconstructs the UE's signal from the "constructive interference" of the multipath and receptions by the base stations 106-101. And, the baseband and MAC layers are calculated in the cloud, not at the antenna as in conventional cell networks. Thus, the base station greater 101 is operable to handle the call through the digitized or virtual RAN.

Although shown or described with respect to the base station aggregator 101 providing communication access to all of the base stations 106-101 of the virtual base station 103, the invention is not intended to be limited as such. The base station aggregator 101 may be operable to form multiple virtual base stations 103 from the base stations 106-101 and provide the additional capacity to the MCO 102, depending on the needs of the MCO 102. For example, the MCO 102 may only require capacity from one base station 106-101. Accordingly, the base station aggregator 101 may virtualize that single base station 106-101 into its own virtual base station 103 and provide that capacity to the MCO 102.

Figure 2:
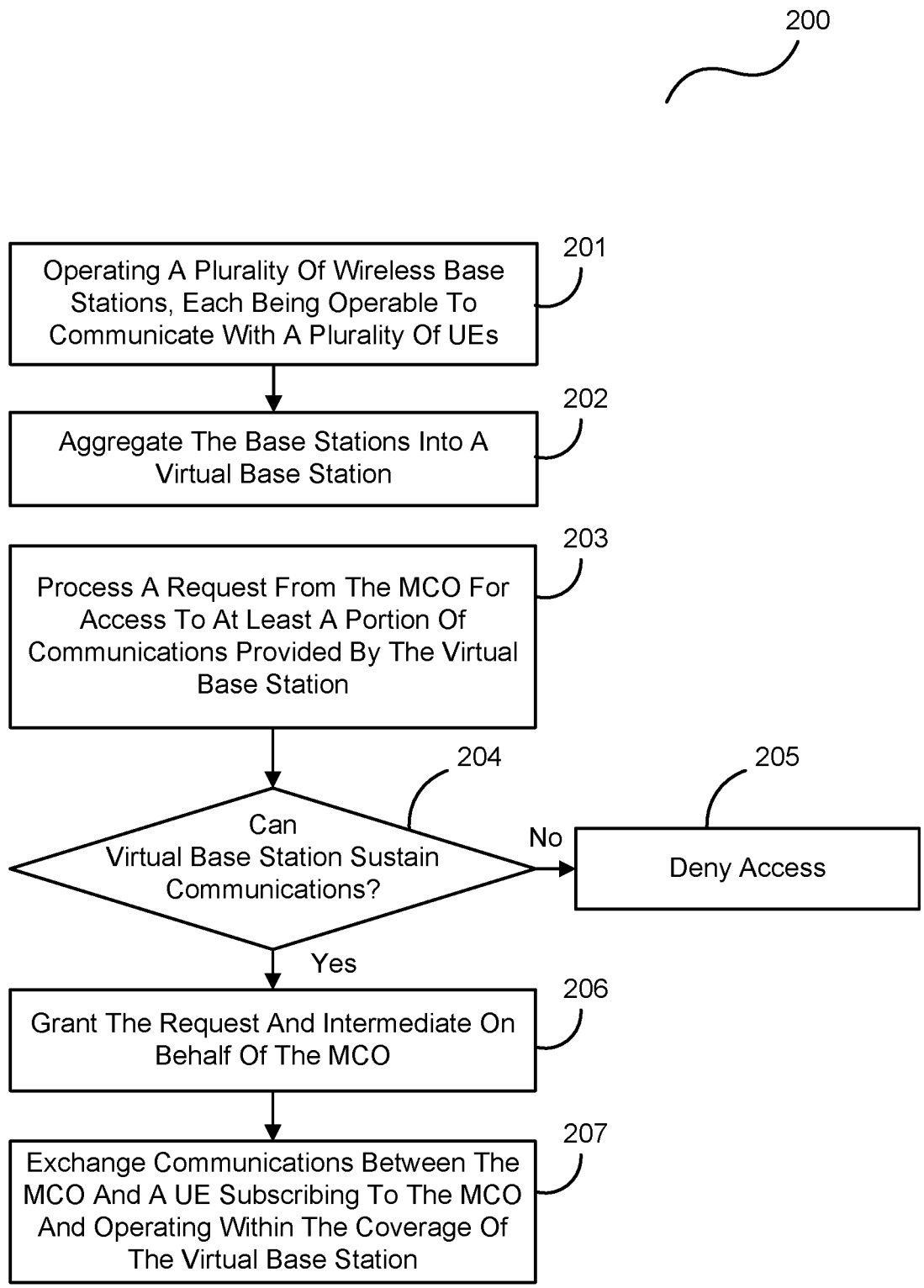
FIG. 2 is a flowchart illustrating an exemplary process operable with the wireless communication system of FIG. 1.

FIG. 2 is a flowchart illustrating an exemplary process 200 operable with the wireless communication system of FIG. 1. In this embodiment, the base station aggregator 101 operates the plurality of wireless base stations 106-101, with each base station 106-101 being operable to communicate with a plurality of UEs, in the process element 201. As mentioned, the base station aggregator 101 is operable to aggregate the base stations 106-101 into a virtual base station 103, in the process element 202. The base station aggregator 101 then processes a request from the MCO 102 for access to at least a portion of the communications provided by the virtual base station 103, in the process element 203.

The base station aggregator 101 then determines whether the virtual base station 103 can sustain the communications for the MCO 102, in the process element 204. For example, the base station aggregator 101 may determine whether it has any capacity to share from the virtual base station 103. If the virtual base station 103 can sustain the communications for the MCO 102 (i.e., capacity does exist), then the base station in aggregator 101 grants request and intermediates on behalf of the MCO 102, in the process element 206. From there, the base station aggregator 101 exchanges communications between the MCO 102 and a subscribing (or roaming) UE of the MCO 102 through the base stations 106-101 of the virtual base station 103, in the process element 207. If the base station aggregator 101 has no available capacity, then the base station aggregator 101 may deny the access to the virtual base station 103, in the process element 205.

Although shown and described with respect to the base station aggregator 101 being operable to provide capacity to a single MCO (e.g., the MCO 102), the invention is not intended be limited as such. For example, the base station aggregator 101 may be operable to interface with any number of MCOs to provide additional capacity based on the capacity of the base stations 106-101 of the virtual base station 103. It should also be noted that access to the additional capacity of the virtual base station 103 can change based on the requirements of the MCO 102. For example, when the MCO 102 no longer requires the additional capacity of the virtual base station 103, then the base station aggregator 101 may close access to the additional capacity of the virtual base station 103 at the direction of the MCO 102.

Moreover, the base station aggregator 101 may be operable to create the virtual base station 103 from the base stations 106-102 as well as the base stations 106-101. For example, assume that the MCO 102 has excess capacity that can be used by another MCO. The station aggregator 101 may acquire those base stations 106-102 and create a virtual base station 103 from those base stations. Additionally, the virtual base station 103 created from the base stations 106-101 and/or the base stations 106-102 of the MCO 102 may include an MCO determined coverage area, MCO determined cell identifier assignments, and native network MCO addressing. Accordingly, the base station aggregator 103 is any device, system, software, or combination thereof operable to virtualize any combination of base stations 106-101 and 106-2 into a virtual base station 103 for use by the MCO 102 or any other MCO requesting additional capacity.

Figure 3:
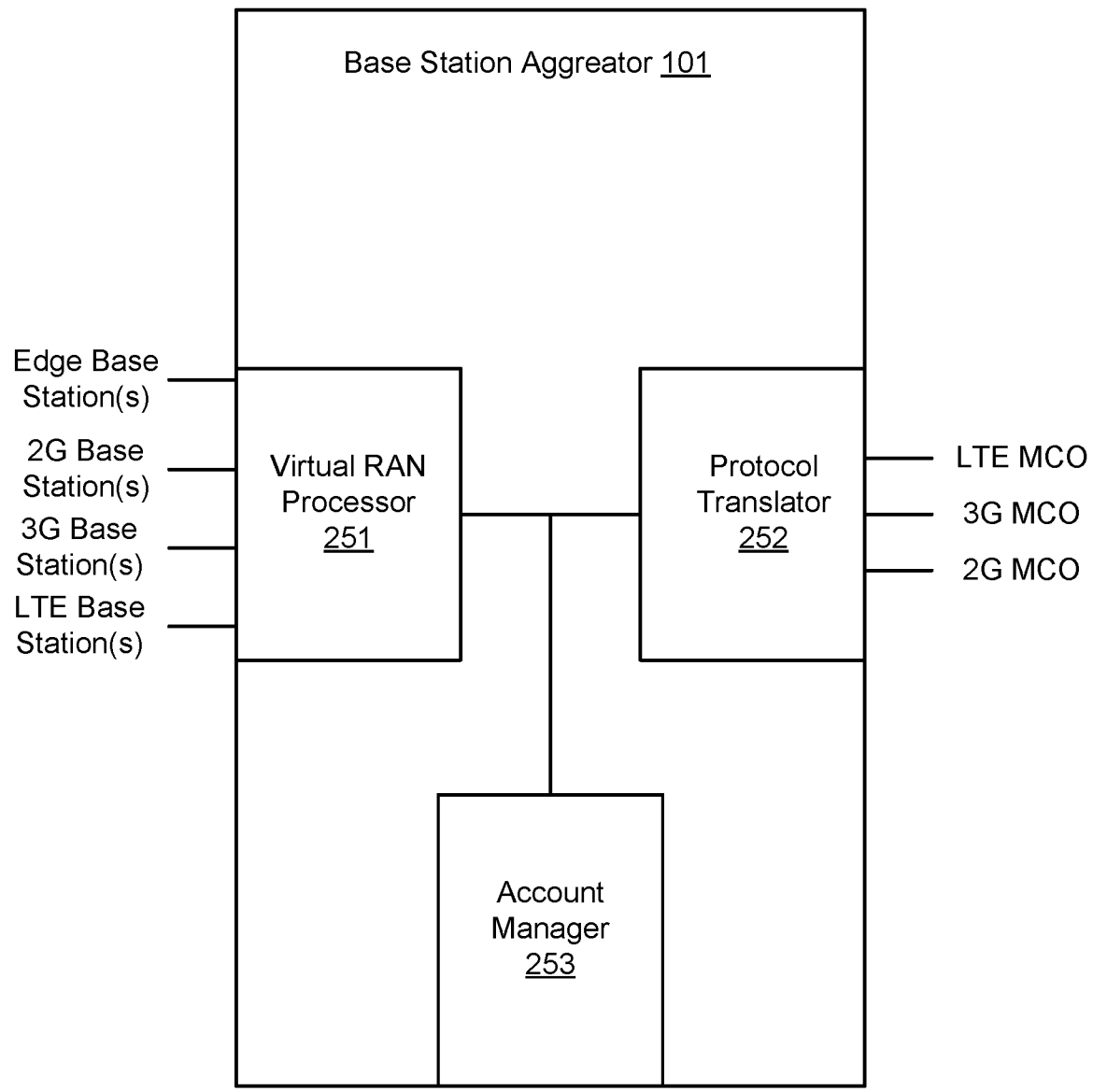
FIG. 3 is a block diagram of an exemplary base station aggregator.

FIG. 3 is a block diagram of an exemplary base station aggregator 101. In this embodiment, the base station aggregator 101 comprises a virtual RAN processor 251 that is operable to interface with a plurality of wireless base stations 106-101. As each of these base stations 106-101 may employ different communication protocols (e.g., 2G, 3G, LTE, etc.), the virtual RAN processor 251 is operable to independently communicate with each of these base stations 106-101 according to their various protocols. The virtual RAN processor 251 establishes a communication interface that aggregates the base stations 106-102 into virtual base station 103 such that the MCO 102 can acquire the additional capacity from those base stations 106-102 through the interface.

As mentioned, the base station aggregator 101 is operable to interface with a plurality of MCOs. However, MCOs may also vary in terms of their communication protocols for various reasons. For example, many MCOs now employ the more modern LTE communication protocols to operate their communication networks (e.g., base stations 106-102 of the network coverage area 104). However, some MCOs have not upgraded to this communication protocol due to various reasons such as finances, catering to lower tier subscribers, etc. Accordingly, these MCOs employ older communication protocols, such as 2G and 3G. In whatever the case, the base station aggregator 101 comprises a protocol translator 252 that is operable to process requests for capacity based on the MCO's communication protocol and then translate communications from the MCO to the communication protocol of the virtual base station 103.

To illustrate, assume that a first MCO employs the LTE communication protocol for its communication network to control its base stations and to communicate with UEs based on that protocol. Now assume that the virtual base station 103 comprises a mix of 2G and 3G base stations 106-101. The virtual RAN processor 251 may implement the virtual base station 103 according to the lower tier service provided by the 2G communication protocol. The protocol translator 252 is operable to translate the LTE communications from the MCO to the lower tier 2G communication protocol to communicate with the virtual base station 103.

When the protocol translator 202 receives a request for additional capacity from the LTE MCO, the virtual RAN processor 251 determines whether there is any available capacity in the virtual base station 103. If so, the virtual RAN processor 251 indicates such to the protocol translator 252 to establish communications between the LTE MCO and the UEs operating within the virtual base station 103. From there, the protocol translator 202 translates the LTE communication protocol to the lower tier 2G communication protocol, and vice versa, such that communications with the UEs operating within the coverage of the virtual base station 103 can be controlled by the LTE MCO. This, of course, may result in fewer services as the LTE communications offer a wider variety of, and typically faster, services.

Now consider an alternative scenario in which the MCO requesting additional capacity from the base station aggregator 101 operates with a 2G communication protocol and that the virtual base station 103 is comprised of a plurality of 3G base stations 106-101. In this example, the virtual RAN processor 251 may present the virtual base station 103 as a 3G base station with more capabilities than the requesting MCO. The protocol translator 252 in this instance would translate communications from the 2G MCO to the 3G virtual base station 103. Accordingly, when the 2G MCO acquires capacity from the base station aggregator 101 and essentially controls the base stations 106-101 of the virtual base station 103, the protocol translator 252 translates the lower tier 2G communication protocol to the higher tier 3G communication protocol of the virtual base station 103.

This, of course, may result in the 2G MCO providing lower tier services to its UEs operating within the coverage of the virtual base station 100.

The above two examples merely illustrate how the virtual RAN processor 251 can aggregate into a single communication protocol operable with the virtual base station 103 and how the protocol translator 252 can translate the communications from a requesting MCO to the virtual base station 103, and vice versa. However, the invention is not intended be limited to these two examples as any combination of virtual base station aggregation and protocol translation can be implemented. For example, the virtual RAN processor 251 can aggregate the base stations 106-101 in any combination of communication protocols. In some instances, the virtual base station 103 may be an aggregation of multiple communication protocols or a single communication protocol. And, as mentioned, base station aggregator 101 can aggregate the base stations 106-101 in any number of virtual base stations 103 to provide capacity to a requesting MCO. The combination of the virtual RAN processor 251 and the protocol translator 252 also provides negotiation of service provided by the protocols. For example, the virtual RAN processor 251 and the protocol translator 252 implement a lower tier protocol may be used when either the MCO 102 or the virtual base station 103 employs such. However, same protocols can be implemented when the virtual base station 103 and the MCO 102 are the same type.

The base station aggregator 101 may also include an account manager 253 that is operable to maintain accounts from requesting MCOs. For example, a requesting LTE MCO may have a different fee structure than a requesting 2G MCO. Accordingly, the account manager 253 charges the requesting MCO for additional capacity provided by the base station aggregator 101 based on the structure. The account manager 253 may also track minutes of service consumed by subscribing or roaming UEs and relay that information to the requesting MCO such that it can charge the UEs accordingly.

Figure 4:
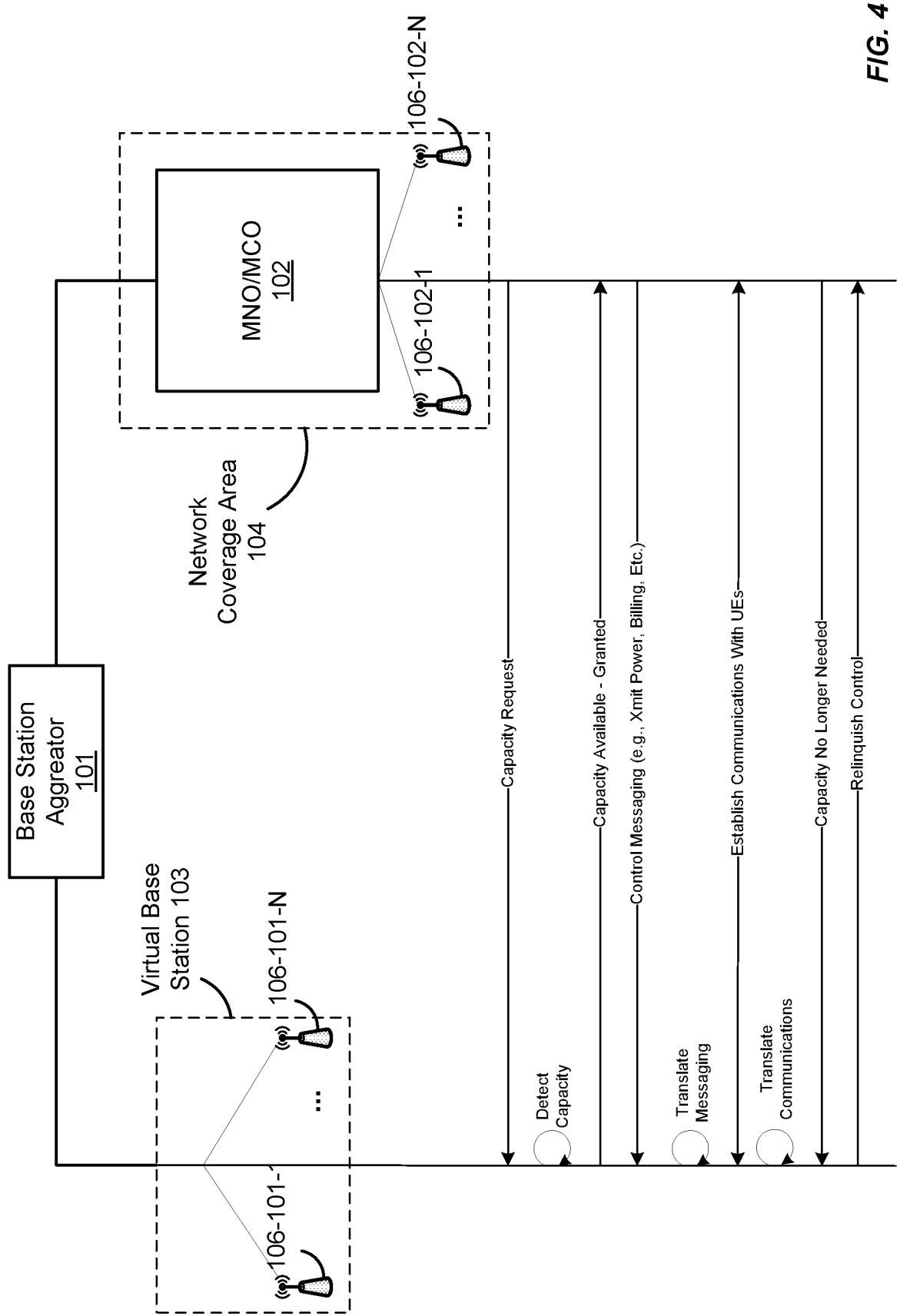
FIG. 4 is an exemplary messaging diagram of the base station aggregator.

FIG. 4 is an exemplary messaging diagram of the base station aggregator 101. In this embodiment, an MNO/MCO 102 operates its base stations 106-101-1-106-102-N in the network coverage area 104 (wherein the reference number "N" represents an integer greater than "1" and not necessarily to any other "N" reference designated herein). The base station aggregator 101 operates its base stations 106-101-1-106-101-N and aggregates them into the virtual base station 103. When the MNO/MCO 102 determines that it needs additional capacity, and transmits a capacity request to the base station aggregator 101. The base station aggregator 101, in turn, detects its available capacity within the virtual base station 103. If capacity is available, then the base station aggregator 101 conveys to the MNO/MCO 102 that capacity is available and that the access to the virtual base station 103 is granted.

After accesses been granted by the base station aggregator 101, the MSO/MCO 102 conveys control messaging such as transmit power control, billing information, and the like, to the base station aggregator 101. The base station aggregator 101 translates the messaging such that communications between the MNO/MCO 102 and the virtual base station 103 can be established and thus communications between the UEs operating in the virtual base station 103 and the MNO/MCO 102 can be established. When the capacity is no longer required by the MNO/MCO 102, the base station aggregator 101 reacquires the virtual base station 103 and directs the MNO/MCO 102 to relinquish its control over the virtual base station 103.

Advantages of the above embodiments provide a rapid integration of network to network interfaces between smaller independent cells and a macro network with little to no disruption of the service to the UEs. For example, the aggregation of smaller independent cells (e.g., the base stations 106-101) into the virtual base station 103 provides a simpler provisioning of mobility procedures for larger MNOs/MCOs. The self-organizing network (SON) process of the base station aggregator 101 also provides auto provisioning of the base stations 106-102 based on the MNOs/MCOs needs. That is, the base station aggregator 101 is able to create virtual base stations 103 based on the capacity needs of the MNOs/MCOs.

And, when a virtual base station 103 is provided to a requesting MCO, the requesting MCO acquires control of the virtual base station 103 and its existing base stations 106-101 such that the requesting MCO can process the communications to reduce interference and/or reduce "ping-ponging". For example, the requesting MCO can control the transmit power of the virtual base station 103 and its existing base stations 106-101 (i.e., through the translation provided by the base station aggregator 101). The SON properties of the base station aggregator 101 allows the MNO/MCO 102 to direct the virtual base station 103 to adjust transmit power of its existing base stations 106-101 such that UEs only operate with a higher power base station 106-101 of the virtual base station 103 as opposed to ping-ponging between proximate base stations 106-101 of the virtual base station 103. This assists in reducing power consumption by the UEs operating within the virtual base station 103.

Other advantages of the base station aggregator 101 the ability to assign cell identifier plans to each virtual base station 103 according to MNO numbering plans and needs and to provide mobility procedures (e.g., handoffs) between the virtual base station 103 and the base stations 106-102 of the MCO 102. Additionally, the base station aggregator 101 can aggregate base stations 106-101 across any geographical area. For example, the base station aggregator 101 may be communicatively coupled to the base stations 106-101 and managed in the cloud such that the base stations 106-101 may be operated globally, thereby allowing the MCO 102 global access to the virtual base station 103 for its subscribing and roaming UEs.

Figure 5:
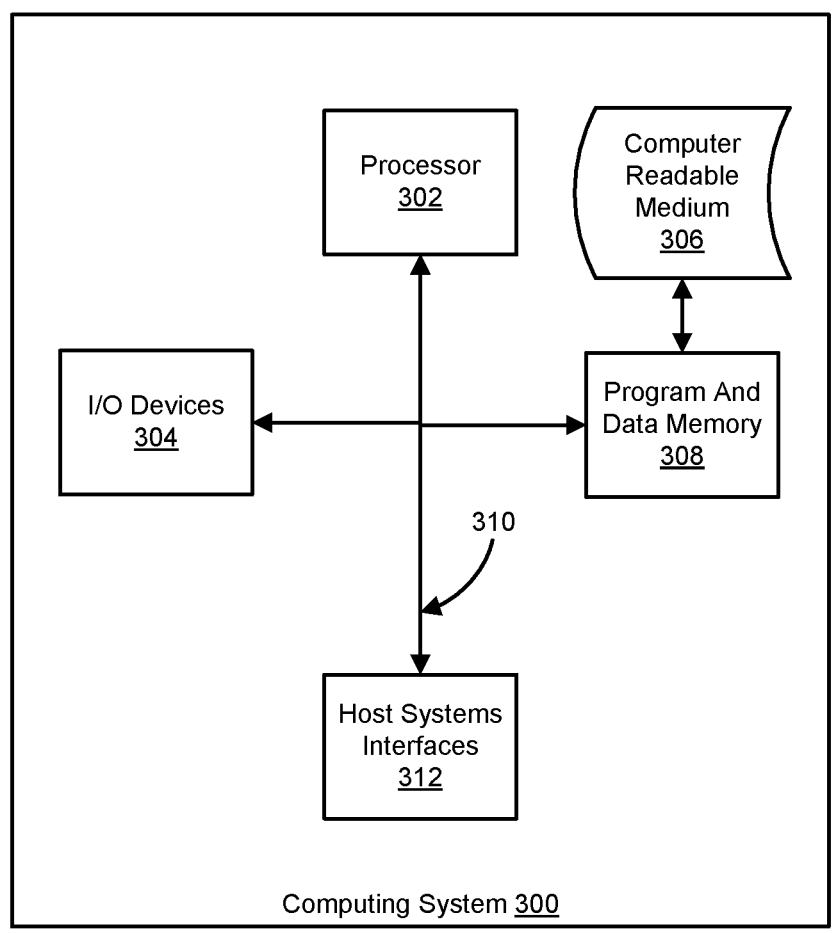
FIG. 5 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A communication system, comprising:
N real wireless base stations, each having at least one antenna and each being operable to communicate with one or more user equipment (UEs) within a respective N cell coverage areas, wherein N is greater than one; and
a base station aggregator operable to aggregate the N real wireless base stations and their respective cell coverage areas into a virtual base station having a network coverage area comprising a combination of two or more of the N cell coverage areas, and to interface with a Mobile Central Office (MCO), the MCO being operable to communicate with subscribing UEs through a network.

2. The communication system of claim 1, wherein:
the base station aggregator is further operable to process a request from the MCO for access to at least a portion of communications provided by the virtual base station, to grant the request, to intermediate on behalf of the MCO, and to exchange communications between the MCO and a first of the subscribing UEs operating within the virtual base station.

3. The communication system of claim 1, wherein:
the base station aggregator is further operable to process a message from the MCO that a second of the subscribing UEs has moved into communication coverage provided by the virtual base station, and to exchange communications between the MCO and the second subscribing UE when the second subscribing UE has moved into the communication coverage of the virtual base station.

4. The communication system of claim 1, wherein:
the network comprises another plurality of real wireless base stations;
the other plurality of real wireless base stations operates according to Long Term Evolution (LTE) wireless protocols;
at least one of the plurality of real wireless base stations of the virtual base station operates according to a second generation (2G) wireless protocol, a third generation (3G) wireless protocol, or a combination thereof; and
the base station aggregator is further operable to translate between the wireless protocol of the other plurality of real wireless base stations and the wireless protocol of the virtual base station.

5. The wireless communication system of claim 1, wherein:
the base station aggregator is further operable to hand over transmit power control of the plurality of real wireless base stations of the virtual base station to the MCO to reduce transmission power of the first subscribing UE.

6. The wireless communication system of claim 1, wherein:
the base station aggregator is further operable to hand off communications of the first UE to the MCO when the first UE moves into communication coverage of the network.

7. The wireless communication system of claim 1, wherein:
the base station aggregator is further operable to interface with another MCO, the other MCO being operable to communicate with its subscribing UEs via another network; and
the base station aggregator is further operable to process a request from the other MCO for access to at least a portion of communications provided by the virtual base station, to grant the request, to intermediate on behalf of the other MCO, and to exchange communications between the other MCO and from a first of its subscribing UEs operating within the virtual base station.

8. The wireless communication system of claim 1, wherein:
the network comprises another plurality of real wireless base stations, each having at least one antenna and each antenna having a cell coverage area; and
the base station aggregator is further operable to aggregate at least a portion of the other plurality of real wireless base stations and their antenna's cell coverage areas into another virtual base station having a network coverage area comprising two or more cell coverage areas.

9. The system of claim 1, wherein each of the respective N cell coverage areas is associated at least in part with the location of each of the N real wireless base station's antenna.

10. The system of claim 1, wherein each of the respective N cell coverage areas are substantially non-overlapping coverage areas.

11. A method of wireless base station aggregation, comprising:
operating N real wireless base stations, each having at least one antenna and each being operable to communicate within a respective N cell coverage areas, with a plurality of user equipment (UEs);
aggregating the N real wireless base stations into a virtual base station having a network coverage area comprising at least two of the N real wireless base station's N cell coverage areas;
interfacing with a Mobile Central Office (MCO), the MCO being operable to communicate with one or more subscribing UEs within the virtual base stations network coverage area via one of the real base stations and its cell coverage area;
processing a request from the MCO for access to at least a portion of communications provided by the virtual base station;
granting the request;
intermediating on behalf of the MCO; and exchanging communications between the MCO and a first of the subscribing UEs operating within the virtual base station, wherein N is greater than one.

12. The method of claim 11, further comprising:

processing a message from the MCO that a second of the subscribing UEs has moved into communication coverage provided by the virtual base station; and exchanging communications between the MCO and the second subscribing UE when the second subscribing UE has moved into the communication coverage of the virtual base station.

13. The method of claim 11, wherein:

the network comprises another plurality of real wireless base stations;

the other plurality of real wireless base stations operates according to Long Term Evolution (LTE) wireless protocols;

at least one of the plurality of real wireless base stations of the virtual base station operates according to a second generation (2G) wireless protocol, a third generation (3G) wireless protocol, or a combination thereof; and the method further comprises translating between the wireless protocol of the other plurality of real wireless base stations and the wireless protocol of the virtual base station.

14. The method of claim 11, further comprising:

handing over transmit power control of the first plurality of real wireless base stations to the MCO to reduce transmission power of the first subscribing UE.

15. The method of claim 11, further comprising:

handing off communications of the first UE to the MCO when the first UE moves into communication coverage of the network.

16. The method of claim 11, further comprising:

interfacing with another MCO, the other MCO being operable to communicate with subscribing UEs via another network;

processing a request from the other MCO for access to at least a portion of communications provided by the virtual base station;

granting the request;

intermediating on behalf of the other MCO; and exchanging communications between the other MCO and a first its subscribing UEs operating within the virtual base station.

17. The method of claim 11, wherein:

the network comprises another plurality of real wireless base stations, each having at least one antenna and each antenna having a cell coverage area; and the method further comprises aggregating at least a portion of the other plurality of real wireless base stations and their antenna's cell coverage areas into another virtual base station having a network coverage area comprising two or more cell coverage areas from the other plurality of real wireless base stations.

18. A non-transitory computer readable medium comprising instructions that, when executed by a wireless communication processor, direct the processor to:

operate N real wireless base stations, each having at least one antenna and each being operable to communicate, within a respective N cell coverage areas, with a plurality of user equipment (UEs);

aggregate the N real wireless base stations into a virtual base station having a network coverage area comprising at least two of the N real wireless base station's N cell coverage areas;

interface with a Mobile Central Office (MCO), the MCO being operable to communicate with one or more subscribing UEs within the virtual base stations network coverage area via one of the real base stations and its cell coverage area;

process a request from the MCO for access to at least a portion of communications provided by the virtual base station;

grant the request;

intermediate on behalf of the MCO; and exchange communications between the MCO and a first of the subscribing UEs operating within the virtual base station, wherein N is greater than one.

19. The computer readable medium of claim 18, further comprising instructions that direct the processor to:

process a message from the MCO that a second of the subscribing UEs has moved into communication coverage provided by the virtual base station; and exchange communications between the MCO and the second subscribing UE when the second subscribing UE has moved into the communication coverage of the virtual base station.

20. The computer readable medium of claim 18, wherein:

the network comprises another plurality of real wireless base stations;

the other plurality of real wireless base stations operates according to Long Term Evolution (LTE) wireless protocols;

at least one of the plurality of real wireless base stations of the virtual base station operates according to a second generation (2G) wireless protocol, a third generation (3G) wireless protocol, or a combination thereof; and the computer readable medium further comprises instructions that direct the processor to translate between the wireless protocol of the other plurality of real wireless base stations and the wireless protocol of the virtual base station.

21. The computer readable medium of claim 18, further comprising instructions that direct the processor to:

hand over transmit power control of the first plurality of real wireless base stations to the MCO to reduce transmission power of the first subscribing UE; and hand off communications of the first UE to the MCO when the first UE moves into communication coverage of the network.

22. The computer readable medium of claim 18, wherein:

the network comprises another plurality of real wireless base stations; and the computer readable medium further comprises instructions that direct the processor:

to aggregate at least a portion of the other plurality of real wireless base stations into another virtual base station;

interface with another MCO, the other MCO being operable to communicate with subscribing UEs via another network;

process a request from the other MCO for access to at least a portion of communications provided by the other virtual base station;

grant the request;

intermediate on behalf of the other MCO; and exchange communications between the other MCO and a first its subscribing UEs operating within the other virtual base station.

23. A communication system, comprising:
a first physical wireless base station, having a first cell coverage area and being operable to communicate with a first plurality of user equipment (UEs);
a second physical wireless base station, having a second coverage area and being operable to communicate with a second plurality of user equipment (UEs); and
a base station aggregator operable to aggregate the first and second physical wireless base stations into a virtual base station having a network coverage area comprising at least the combination of the cell coverage areas, and configured to interface with a Mobile Central Office (MCO), the MCO being operable to communicate with subscribing UEs through a network.

24. The system of claim 23, wherein the first plurality of UEs and the second plurality of UEs share at least one UE in common.

25. The system of claim 23, further comprising a third physical wireless base station, wherein the base station aggregator is configured to aggregate third physical wireless base station with the first and second physical wireless base stations into the virtual base station.

26. The system of claim 23, wherein the first coverage area and the second coverage area are substantially non-overlapping coverages areas.

27. The system of claim 23, wherein the first coverage area and the second coverage area are partially overlapping coverages areas.

* * * * *